United States Patent [19]
Horrocks

[11] 4,059,762
[45] Nov. 22, 1977

[54] METHOD AND APPARATUS FOR DETERMINING ACCURACY OF RADIATION MEASUREMENTS MADE IN THE PRESENCE OF BACKGROUND RADIATION

[75] Inventor: Donald L. Horrocks, Placentia, Calif.

[73] Assignee: Beckman Instruments, Inc., Fullerton, Calif.

[21] Appl. No.: 686,973

[22] Filed: May 17, 1976

[51] Int. Cl.² ............................................. G01T 1/20
[52] U.S. Cl. ..................................... 250/336; 250/369
[58] Field of Search .................... 250/252, 262, 363 S, 250/369, 336

[56] References Cited

U.S. PATENT DOCUMENTS 3,510,655  5/1970  Givens ................................. 250/262

Primary Examiner—Harold A. Dixon
Attorney, Agent, or Firm—Robert J. Steinmeyer; Robert R. Meads

[57] ABSTRACT

A radioactivity measuring instrument, and a method related to its use, for determining the radioactivity of a sample measured in the presence of significant background radiation, and for determining an error value relating to a specific probability of accuracy of the result. Error values relating to the measurement of background radiation alone, and to the measurement of sample radiation and background radiation together, are combined to produce a true error value relating to the sample radiation alone.

10 Claims, 2 Drawing Figures

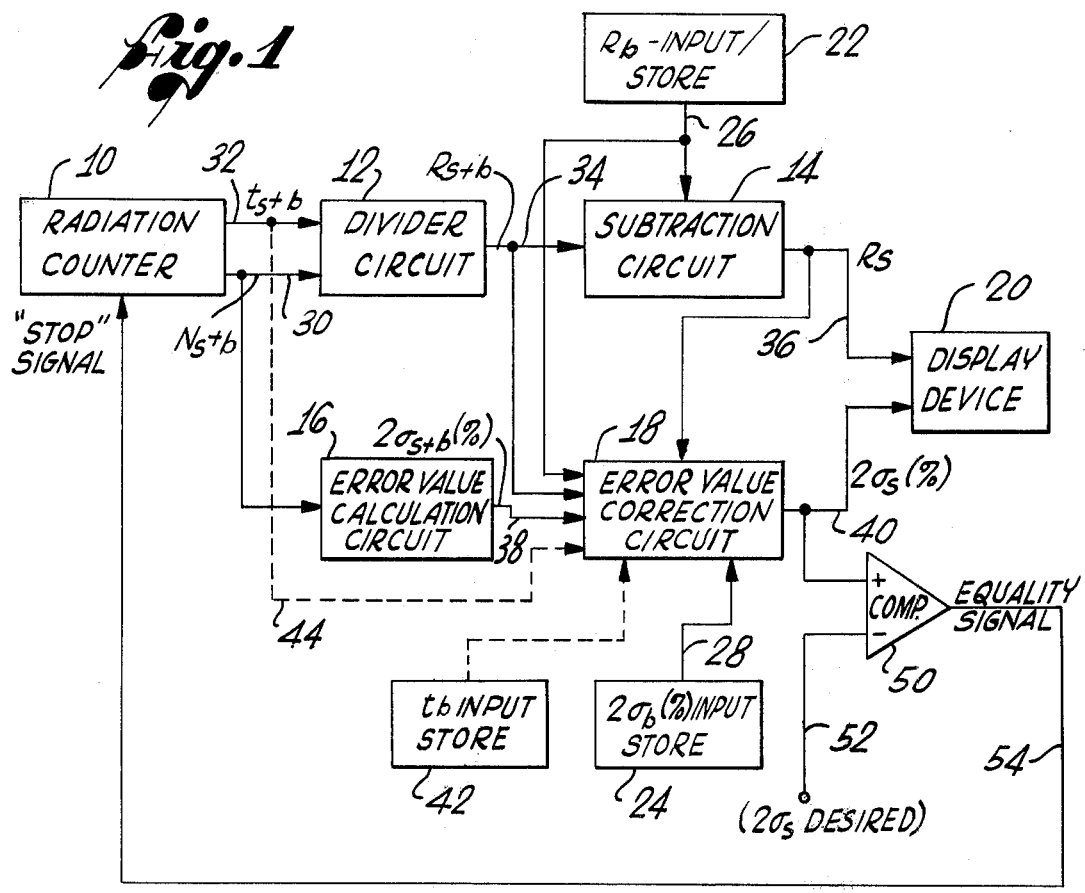
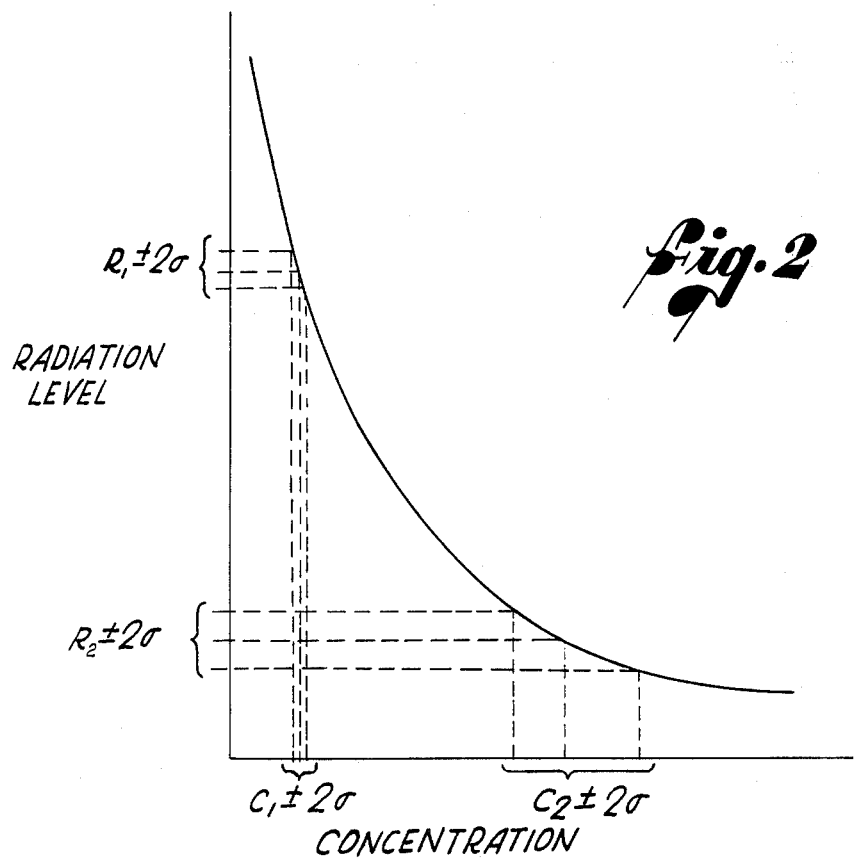

METHOD AND APPARATUS FOR DETERMINING ACCURACY OF RADIATION MEASUREMENTS MADE IN THE PRESENCE OF BACKGROUND RADIATION

BACKGROUND OF THE INVENTION

The present invention relates generally to the measurement of radioactivity and, more particularly, to the measurement of the radioactivity of a sample in an environment in which there is a significant background level of radiation not attributable to the sample itself. Many commercial radiation counters include a feature which allows for the automatic subtraction of a predetermined quantity, representing background radiation, from the measured radiations rate of the sample, to obtain a radiation rate attributable to the sample alone. However, as will be explained, these instruments provide a false indication of the actual statistical error limits relating to the radiation rate of the sample alone.

In general, instruments for the measurement of radioactivity operate by detecting discrete radiations, and accumulating a count of the detected radiations. Depending on the decay characteristics of the sample being tested, and on the particular experiment being conducted, the instrument will usually be adjusted to detect radiation with energies falling within preselected energy limits which define an energy level range or "window". Since the process of radioactive decay is a random one, the accuracy of any measurement of radioactivity, in counts per unit time, will depend upon the number of counts detected during the course of the measurement. It will be apparent that, if a large number of counts is accumulated over a relatively long testing period, the counts-per-unit-time measurement obtained will be more accurate than if a smaller number of counts were measured over a correspondingly shorter period of time.

A statistical parameter which is often used in radiation measurement to indicate the reliability of a measurement of radiation, is the standard deviation, indicated by the symbol $\sigma$. As will be further explained, in some cases it is desirable to express the reliability of a measurement in terms of a multiple of the standard deviation, e.g. $2\sigma$. Hereinafter the terms "error value" and "+E" will be used to include standard deviation and multiples thereof. The value of the standard deviation for a number of counts N is given by the equation:

$$\pm \sigma_N = \pm \sqrt{N}. \tag{1}$$

In percentage form, the standard deviation is given by:

$$\pm \sigma_N(\%) = \pm \frac{100 \sqrt{N}}{N} = \pm \frac{100}{\sqrt{N}} \tag{2}$$

The significance of the standard deviation is that, for a large number of measurements, there is a 68.3% probability that any equivalent measurement taken will be within $\pm\sigma$ of the mean value of the large number of measurements. In the measurement of radioactivity, each accumulated count essentially constitutes a new measurement. More specifically, each time a count is accumulated, it provides, together with all the preceding counts, a new basis for determining the radioactivity of the sample. Accordingly, after the accumulation of N counts, there is a 68.3% probability that a second measurement based on the accumulation of counts for the same time period will be within $\pm\sigma_N$ of the average value of radioactivity determined from the N counts. Stated another way, there is a 68.3% probability that the true radioactivity of the sample is within the range $\pm\sigma_N$ of the radioactivity determined from N counts.

As mentioned above, it is also common in the measurement of radioactivity to use twice the standard deviation, i.e., $\pm 2\sigma$, where this has the significance that 95.5% of the measured values will be within $\pm 2\sigma$ of the average value. The calculation of $\pm 2\sigma$ is performed in accordance with the equation:

$$\pm 2\sigma_N = \pm 2\sqrt{N}, \tag{3}$$

or, in percentage form:

$$\pm 2\sigma_N(\%) = \pm \frac{200\sqrt{N}}{N} = \pm \frac{200}{\sqrt{N}}. \tag{4}$$

In many applications involving the measurement of radioactivity, it is extremely important that the range of possible errors in a measurement be known accurately. For example, one such application involves the use of radioactive isotopes as tracers in radioimmunoassay procedures for the measurement of concentration levels of specific antigens, antibodies or other substances in blood. A diagnosis of a patient's condition, based on the measurement of the radioactivity of these tracers in a blood sample, might well be an incorrect one if the range of possible error in the radiation count is not reliably known.

This problem is further compounded by the characteristic shape of a typical response curve relating the measured level of radioactivity to the concentration of some substance in the blood sample being measured. Complex chemical reactions are usually involved, and the concentration typically decreases with increasing radiation levels, and increases with decreasing radiation levels. More importantly, a small error in detected radiation at relatively low levels of radiation will, because of the slope of the curve, be reflected as a relatively larger error in estimated concentration. Accordingly, if the range of error in the radiation level is not accurately known, this inaccuracy is reflected in a still larger inaccuracy in the range of error in the concentration being monitored, and may thereby limit the reliability of clinical diagnosis for a patient.

As mentioned earlier, many commercial radiation counters are capable of automatically subtracting a preset quantity, indicative of a measured background level of radiation, from the measured radiation rate. Moreover, many instruments of this type will also calculate and display an error value, such as $\pm\sigma$ or $\pm 2\sigma$, for the count rate measured. However, in all such prior art instruments the error value presented to the user is derived only from the total actual number of counts measured, which, of course, in indicative of the level of radiation from both sample and background sources taken together. The error value computed in this manner, i.e., without reference to the error value relating to the measurement of background radiation alone, may be different from the true error value by a rather substantial factor, depending on the specific magnitudes of the sample and background radiation levels.

SUMMARY OF THE INVENTION

The present invention resides in a method, and corresponding means for implementation in a radiation measurement instrument, for the calculation and presentation of a true error value relating to the radioactivity of a sample alone when measured in the presence of background radiation. Briefly, and in general terms, the method of the invention includes the steps of measuring the background radiation alone, measuring radiation from the sample in the presence of the background radiation, determining by subtraction the radiation attributable to the sample alone, and determining the true error value in the value of sample radiation by combining the error value relating to the measurement of background radiation alone and the error value relating to sample radiation combined with background radiation.

More specifically, the radioactivity count rate of the sample is determined by subtracting the count rate attributable to background radiation from the count rate attributable to the combination of sample radiation and the background radiation together. More importantly, the error value for the count rate of the sample alone is determined by taking the square root of the sum of the squares of the error values relating to the background count rate and to the count rate resulting from the background and sample taken together.

In one embodiment of the apparatus of the invention, an operator enters a value for the background count rate, and the corresponding error value for the background count rate, into the instrument. The instrument includes means for measuring sample and background radiation together, means for computing an error value for the sample and background radiation together, means for obtaining the sample count rate from the background count rate and sample and background count rate together, and means for determining the error value relating to the sample count rate from the measured count rates and the values supplied by the operator.

In a related embodiment, the instrument is first used to measure the radiation from a background or "blank" sample, from which are derived a background count rate and a corresponding error value. These quantities are then stored for subsequent use in computing the sample count rates and corresponding sample error values for subsequent samples.

In accordance with another aspect of the invention, measurement of radioactivity in the instrument can be terminated automatically when the computed true error value relating to the sample count is reduced to a desired level. To implement this feature, the error value relating to the sample count must be computed frequently during the measurement process, and compared with the desired error value after each computation.

In another embodiment of the invention, the values of the background radiation count and the time spent in obtaining the background count are input to the instrument by the operator. The sample radiation count is computed as before, but the error value is computed using a related but different formula and corresponding apparatus.

It will be appreciated from the foregoing, and from the detailed description which follows, that the present invention represents a significant advance in the field of radiation measurement, especially as it applies to the measurement of relatively low radiation levels in environments of significant background radiation. In particular, the invention provides for the measurement of sample radiation together with the determination of a more accurate error value than has hitherto been provided by prior art instruments of the same general type. Other aspects and advantages of the invention will become apparent from the following more detailed description, taken in conjunction with the accompanying drawings.

BRIEF DESCRIPTION OF THE DRAWINGS

FIG. 1 is a block diagram of the presently preferred embodiment of a radiation measurement apparatus incorporating the features of the present invention; and FIG. 2 is a typical dose response curve for a radioimmunoassay test in which the invention can be usefully employed, showing the relationship between the radiation level in a blood sample and the concentration of some substance in the blood.

DETAILED DESCRIPTION

The present invention is principally concerned with apparatus, and a related method, for determining the true error value associated with a radioactivity measurement made in the presence of significant background radiation. Although instruments available heretofore have correctly computed and displayed a sample radiation level by subtracting out a separately measured background radiation level, these instruments have erroneously based the calculation of the error value (the statistical measure of the probability of error in the result) on a measurement of sample and background radiation levels taken together. The present invention is directed to the determination of an error value which also takes into account the error value related to the separate measurement of the background radiation.

In accordance with the method of the present invention, the background radiation is measured alone, then the radiation attributable to both the sample and background together are measured. The radiation attributable to the sample alone is determined by subtraction, as in instruments of the prior art, but the error value relating to the sample alone is determined by combining the error value relating to the measured background radiation alone and the error value relating to the measured radiation from the sample and background together.

The following symbols are used in the equations which follow:

$N_s$ = number of counts attributable to sample radiation,
$N_b$ = number of counts attributable to background radiation,
$N_{s+b}$ = number of counts attributable to sample and background radiation together,
$t_b$ = time of measurement of background counts,
$t_{s+b}$ = time of measurement of background and sample counts together,
$R_s$ = radiation rate of sample (counts/minute),
$R_b$ = radiation rate of background (counts/minute),
$R_{s+b}$ = radiation rate of background and sample together (counts/minute),
$\pm 2\sigma_s(\%)$ = percentage error value relating to $R_s$,
$\pm 2\sigma_s$ = absolute error value relating to $R_s$,
$\pm 2\sigma_b(\%)$ = percentage error value relating to $R_b$,
$\pm 2\sigma_b$ = absolute error value relating to $R_b$,
$\pm 2\sigma_{s+b}(\%)$ = percentage error value relating $R_{s+b}$, and
$\pm 2\sigma_{s+b}$ = absolute error value relating to $R_{s+b}$.

It should be apparent that, if $t_b = t_{s+b}$, i.e., if the times of measurement of the background radiation and the background and sample radiation together, then:

$$N_s = N_{s+b} - N_b. \quad (5)$$

More generally, $$R_b = N_b/t_b, \quad (6)$$

$$R_{s+b} = N_{s+b}/t_{s+b}, \text{ and} \quad (7)$$

$$R_s = R_{s+b} - R_b. \quad (8)$$

The error value $\pm 2\sigma_b$ relating to $R_b$ is given by $$\pm 2\sigma_b = \pm 2\sqrt{N_b}/t_b \quad (9)$$

and the error value $\pm 2\sigma_{s+b}$ relating to $R_{s+b}$ is given by $$\pm 2\sigma_{s+b} = \pm 2\sqrt{N_{s+b}}/t_{s+b}. \quad (10)$$

The absolute error value $\pm 2\sigma_s$ relating to $R_s$, then is given by:

$$\pm 2\sigma_s = \pm \sqrt{(2\sigma_{s+b})^2 + (2\sigma_b)^2} \quad (11)$$

$$= \pm \sqrt{\left(\frac{R_{s+b} \cdot 2\sigma_{s+b}(\%)}{100}\right)^2 + \left(\frac{R_b \cdot 2\sigma_b(\%)}{100}\right)^2}$$

In percentage terms, the true error value relating to $R_s$ is given by:

$$\pm 2\sigma_s(\%) = \pm (200\sigma_s/R_s). \quad (12)$$

As shown in FIG. 1, a presently preferred embodiment of the apparatus of the present invention includes a conventional radiation counter 10, a divider circuit 12, a subtraction circuit 14, an error value calculation circuit 16, an error value correction circuit 18, and a display device 20. As indicated at 22 and 24, respectively, values of the background radiation rate ($R_b$) and its associated error value ($2\sigma_b$) are provided as input by an operator over lines 26 and 28 to the subtraction circuit 14 and the error value correction circuit 18, respectively.

From the radiation counter 10 are derived values of a count ($N_{s+b}$), on line 30, and a time ($t_{s+b}$), on line 32, relating to the measurement of a sample and background radiation together. These values are transmitted to the divider circuit 12, where the value of $R_{s+b}$ is determined in accordance with equation (7). The $R_{s+b}$ value is transferred to the subtraction circuit 14 over line 34, and the value of $R_s$ is determined in the subtraction circuit and output over line 36 to the display device 20, which may be any convenient output device, such as a printer or digital display unit.

The error value calculation circuit 16 determines the error value in the measurement of sample and background radiation together ($2\sigma_{s+b}(\%)$) in accordance with the expression:

$$\pm 2\sigma_{s+b}(\%) = \pm(200\sqrt{N_{s+b}}). \quad (13)$$

This value is transmitted over line 38 to the error value correction circuit 18, where the value of error value $2\sigma_s(\%)$ for the sample radiation value $R_s$ is determined in accordance with equations (11) and (12), and transferred over line 40 to the display device 20. The error value correction circuit 18 also utilizes values of $R_b$ obtained from line 26, $R_{s+b}$ from line 34, and $R_s$ from line 36.

The principal circuit components of the apparatus, i.e., the divider circuit 12, subtraction circuit 14, error value calculation circuit 16 and error value correction circuit 18, may be any conventional analog or digital circuits for performing the functions described herein. These elements may be implemented in a variety of specific embodiments, the details of which are not in any way critical to the present invention.

Moreover, although the various circuit functions have been described in relation to the determination of an error value $2\sigma$, it will be appreciated that similar circuitry may be employed to determine an error value $\sigma$, or some other criterion of statistical accuracy.

In accordance with one embodiment of the invention, initially the values of $R_b$ and $2\sigma_b(\%)$ are determined when a blank sample is placed in the counter 10. These values are then stored internally in the instrument, to be transmitted over lines 26 and 28, respectively, when other samples are subsequently placed in the counter. Operation of the apparatus is then automatic, with the first sample being used to determine the background radiation, and with the radiation rates and error values of subsequent samples being automatically determined and displayed.

In an alternate embodiment of the invention, the background error value $2\sigma_b(\%)$ is not initially computed, but instead the time $t_b$ of the background radiation measurement is provided as input, as shown at 42, along with the value of $R_b$. In this embodiment, the calculation of $2\sigma_s$ is made in accordance with the expression:

$$\pm 2\sigma_s = \pm 2\sqrt{\frac{R_{s+b}}{t_{s+b}} + \frac{R_b}{t_b}}. \quad (14)$$

The value of $t_{s+b}$ is obtained over line 44, shown as a broken line in FIG. 1, and $\pm 2\sigma_s(\%)$ is determined, as before, from equation (12).

The following example of the determination of $R_s$ and $\pm 2\sigma(\%)$ in accordance with the invention is based on measured counts and times of:

$N_b = 1055$ counts,
$t_b = 50$ minutes,
$N_{s+b} = 912$ counts, and
$t_{s+b} = 20$ minutes.

The percentage error values, from equation (4) are:

$$\pm 2\sigma_b(\%) = \pm \sqrt{\frac{200}{N_b}} = \pm \sqrt{\frac{200}{1055}} = \pm 6.16\%, \text{ and}$$

$$\pm 2\sigma_{b+s}(\%) = \pm \sqrt{\frac{200}{N_{b+s}}} = \pm \sqrt{\frac{200}{912}} = \pm 6.62\%.$$

The radiation rates are:
$R_b = 1055/50 = 21.10$ counts/minutes, from equation (6),
$R_{s+b} = 912/20 = 45.60$ counts/minutes, from equation (7), and
$R_s = R_{s+b} - R_b = 45.60 - 21.10 = 24.50$ counts/minute, from equation (8).
Substituting into equation (11), $$\pm 2\sigma_s = \pm \sqrt{\left(\frac{45.60 \times 6.62}{100}\right)^2 + \left(\frac{21.10 \times 6.16}{100}\right)^2}$$

$$= \pm \sqrt{(3.02)^2 + (1.30)^2}$$

$$= \pm 3.29 \text{ counts/minute.}$$

I.e., $R_s = 24.50 \pm 3.29$ counts/minute.
$= 24.50 \pm 13.43\%$ counts/minute.

Thus, there is a 95.5% probability that the true value of $R_s$ falls in the range $24.50 \pm 3.29$ counts/minute.

Alternatively, if the values of $R_b$ and $t_b$ were supplied to the apparatus, rather than the values of $R_b$ and $2\sigma_b$, the error value would be calculated from equation (14):

$$\pm 2\sigma_s = \pm 2 \sqrt{\frac{R_{s+b}}{t_{s+b}} + \frac{R_b}{t_b}}$$

$$= \pm 2 \sqrt{\frac{45.60}{20} + \frac{21.10}{50}}$$

$$= \pm 3.29 \text{ counts/minute.}$$

The radiation counter 10 can be operated for a fixed period to time in measuring radiation from a sample, after which the values of $R_s$ and $\pm 2\sigma_s(\%)$ are determined, or it can be operated until a preselected number of counts has been accumulated. Alternatively, it can be operated until a desired accuracy is obtained, as reflected in a preselected value of $\pm 2\sigma_s(\%)$. If the instrument is operated in accordance with the latter alternative, the measurement of $R_s$ and its error value can be made automatic by the inclusion of a comparator 50 which continually compares the value of the calculated $\pm 2\sigma_s(\%)$ with a desired value input on line 52. When the desired error value equals or exceeds the measured one, an equality signal is generated on output line 54 from the comparator 50, and fed back to the radiation counter to terminate its operation. To be operated in this manner, the apparatus must be actuated frequently, as often as every detected count if desired, to generate an updated error value for comparison with the desired error value. If the radiation counter 10 is operated for a preselected time, or until a preselected number of counts is accumulated, the apparatus need only be actuated once for each radiation measurement, to determine $R_s$ and its error value when the counter has terminated its operation.

FIG. 2. shows the characteristic shape of a typical curve plotting the relationship between measured radiation level and the concentration of some substance in the blood that is to be monitored in a radiommunoassay test. Usually in such tests, complex chemical reactions are involved, none of which are of direct concern here, and the concentration being monitored typically varies inversely with respect to the radiation level, resulting in an approximately hyperbolic curve. At relatively high radiation levels, e.g., as indicated at $R_1$, the corresponding concentration value, shown at $C_1$ will have a relatively small error value. However, at relatively low radiation levels, such as $R_2$, the error value associated with the corresponding concentration value $C_2$ will, because of the slope of the curve in that region, be relatively large. It will therefore be apparent that an inaccurate error value at low radiation levels is magnified in its effect by the typical shape of the response curve used in radioimmunoassay tests.

As a further example, consider the radioimmunoassay data in the following table resulting from the accumulation of 10,000 counts for each of five samples and a blank sample:

| Sample | Time (Min.) | $R_{s+b}$ | $R_2$ | $\pm 2\sigma_s(\%)$ (Equation 12) |
|---|---|---|---|---|
| Blank | 10.0 | 1000 | — | — |
| 1 | 2.0 | 5000 | 4000 | 2.55 |
| 2 | 3.33 | 3000 | 2000 | 3.16 |
| 3 | 5.0 | 2000 | 1000 | 4.47 |
| 4 | 6.67 | 1500 | 500 | 7.21 |
| 5 | 8.33 | 1200 | 200 | 15.62 |

The error value as computed by prior art instruments would be:

$$\pm \sqrt{\frac{200\%}{N_{s+b}}}$$

$$= \pm \sqrt{\frac{200\%}{10,000}}$$

$$= \pm 2\% \text{ for each sample.}$$

This should be compared with the true error values ranging up to 15%, determined from the same data.

Another common test procedure is to measure all of the samples for a fixed time, e.g., 2 minutes, as in the following example utilizing the same samples as in the previous example:

| Sample | $R_{s+b}$ | $R_2$ | $\pm 2\sigma_{s+b}(\%)$ (Prior Art) | $\pm 2\sigma_s(\%)$ (Equation 12) |
|---|---|---|---|---|
| Blank | 1000 | — | — | — |
| 1 | 5000 | 4000 | 2.00 | 2.74 |
| 2 | 3000 | 2000 | 2.50 | 4.47 |
| 3 | 2000 | 1000 | 3.16 | 7.75 |
| 4 | 1500 | 500 | 3.65 | 14.14 |
| 5 | 1200 | 200 | 4.08 | 33.17 |

Again, it can be seen that the error values presented by prior art instruments are grossly inaccurate, and may be only a small fraction of the true error value which obtains when relatively low radiation levels are being measured.

It will be appreciated from the foregoing that the present invention provides a significant improvement in the field of radiation measurement in the presence of background radiation. In particular, the invention provides for a more accurate determination of error value than has previously been obtainable on instruments of the same general type. Although the invention has been described in detail with reference to specific embodiments and examples, it will be understood that various modifications may be made without departing from the spirit and scope of the invention. Accordingly, the invention is not to be limited except as by the appended claims.

I claim:

1. A method of determining the accuracy of a measurement of radioactivity of a sample alone when taken in the presence of background radiation, said method comprising the steps of:
   measuring the background radiation alone;
   measuring radiation from the sample in the presence of said background radiation;

determining error values respectively related to said measuring steps;

determining the radiation attributable to the sample alone, by subtracting the result of said first-mentioned measuring step from the result of said second-mentioned measuring step; and determining the accuracy of the result of said last-mentioned step by combining the error values related to said measuring steps.

2. A method as set forth in claim 1, wherein:

said determining steps are performed from time to time during said second-mentioned measuring step; and said method further includes the steps of comparing the determined error value of the determined radiation of the sample with a desired error value, and terminating said second-mentioned measuring step when the determined error value reaches the desired error value.

3. A method as set forth in claim 1, and further including the step of storing the measured value of background radiation and the associated error value, for subsequent use by said steps of determining sample radiation and its associated error value.

4. A method of determining an error value $\pm E_s$ relating to a particular probability of accuracy of a measurement of radioactivity of a sample taken in the presence of background radiation, said method comprising the steps of:

measuring the background radiation $R_b$ alone;

measuring radiation $R_{s+b}$ from the sample in the presence of the background radiation;

determining error values $\pm E_b$ and $\pm E_{s+b}$ relating to the respective results of said measuring steps, there being a particular probability that the true values of radiation measured in said measuring steps fall within the ranges $R_b \pm E_b$ and $R_{s+b} \pm E_{s+b}$, respectively;

determining the radiation $R_s$ attributable to the sample alone by substracting $R_b$ from $R_{s+b}$; and determining the error value $\pm E_s$ relating to the value of $R_s$ by combining the values of $\pm E_b$ and $+E_{s\pm b}$.

5. A method as set forth in claim 4, wherein said step of determining the error value $\pm E_s$ is performed in accordance with the expression:

$$\pm E_s = \pm \sqrt{(E_b)^2 + (E_{s+b})^2}.$$

6. A method as set forth in claim 4, wherein:

said determining steps are performed from time to time during said step of measuring $R_{s+b}$; and said method further includes the steps of comparing the determined error value $\pm E_s$ with a desired error value, and terminating said step of measuring $R_{s+b}$ when the magnitude of the error value $\pm E_s$ reaches the desired error value.

7. Apparatus for determining the accuracy of a measurement of radioactivity of a sample taken in the presence of background radiation, said apparatus comprising:

radioactivity event counting means for accumulating counts of radioactive events detected as being attributable to background radiation alone and for accumulating counts attributable to the sample taken together with the background radiation;

dividing circuit means for providing a signal indicative of the time rate of accumulation of counts by said event counting means;

error value calculation circuit means for determining an error value relating to a particular probability of accuracy of the values of rate of accumulation of counts;

subtraction circuit means for subtracting a signal indicative of a radiation rate from the background from signal indicative of a radiation rate from the sample and background together, to obtain a radiation rate attributable to the sample alone; and error value correction circuit means, for combining error values relating to the rates of radiation from the background alone and from the background and sample together, and for thereby generating an error value relating to the radiation rate of the sample alone.

8. Apparatus as set forth in claim 7, and further including display means for visually displaying values of the radiation rate attributable to the sample alone, and its associated error value determined in said error value correction circuit means.

9. Apparatus as set forth in claim 7, and further including:

comparator means for comparing error values determined from time to time by said error value correction circuit means with a desired error value; and means for terminating operation of said event counting means when said comparator means detects that the determined error value has reached the desired error value.

10. Apparatus as set forth in claim 7, wherein:

the error values relating to the radiation rates from the background alone and the background and sample together are $\pm E_b$ and $\pm E_{s+b}$, respectively; and the error value determined by said error value correction circuit means is given by the expression $\pm E_s = \pm \sqrt{(E_b)^2 + (E_{s+b})^2}$.

* * * * *